US006708283B1

(12) United States Patent
Nelvin et al.

(10) Patent No.: US 6,708,283 B1
(45) Date of Patent: Mar. 16, 2004

(54) SYSTEM AND METHOD FOR OPERATING A SYSTEM WITH REDUNDANT PERIPHERAL BUS CONTROLLERS

(75) Inventors: Robert E. Nelvin, Derry, NH (US); Mark D. Tetreault, Webster, MA (US); Andrew Alden, Leominster, MA (US); Mohsen Dolaty, Acton, MA (US); John W. Edwards, Jr., Clinton, MA (US); Michael W. Kement, Northboro, MA (US); John R. MacLeod, Cambridge, MA (US)

(73) Assignee: Stratus Technologies, Bermuda Ltd., Hamilton (BM)

( * ) Notice: Subject to any disclaimer, the term of this patent is extended or adjusted under 35 U.S.C. 154(b) by 0 days.

(21) Appl. No.: 09/548,200

(22) Filed: Apr. 13, 2000

(51) Int. Cl.$^7$ .................................................. G06F 11/00
(52) U.S. Cl. .............................. 714/5; 714/43; 710/316
(58) Field of Search .............................. 714/5, 43, 44, 714/56; 710/312, 313, 314, 315, 316, 302, 304

(56) References Cited

U.S. PATENT DOCUMENTS

| 3,544,973 A | 12/1970 | Borck, Jr. et al. ........ 340/172.5 |
| 3,548,176 A | 12/1970 | Shutler ....................... 235/153 |
| 3,641,505 A | 2/1972 | Artz et al. ................ 340/172.5 |
| 3,710,324 A | 1/1973 | Cohen et al. ............. 340/172.5 |
| 3,736,566 A | 5/1973 | Anderson et al. ........ 340/172.5 |
| 3,795,901 A | 3/1974 | Boehm et al. ............ 340/172.5 |
| 3,805,039 A | 4/1974 | Stiffler ................... 235/153 AE |
| 3,820,079 A | 6/1974 | Bergh et al. ............. 340/172.5 |
| 3,840,861 A | 10/1974 | Amdahl et al. .......... 340/172.5 |
| 3,997,896 A | 12/1976 | Cassarino, Jr. et al. .. 340/172.5 |

(List continued on next page.)

FOREIGN PATENT DOCUMENTS

| EP | 0 299 700    * | 7/1987 | ............ G06F/13/42 |
| EP | 0 301 499 A2   | 2/1989 | ............ G06F/11/16 |

(List continued on next page.)

*Primary Examiner*—Scott Baderman
(74) *Attorney, Agent, or Firm*—Testa, Hurwitz & Thibeault, LLP (57) ABSTRACT

The inventive system essentially hides redundant paths to the peripheral devices from the operating system, by reporting a single "virtual" path to the peripheral busses over PCI bus 0. The virtual path includes at least a virtual peripheral bus controller and a virtual video controller. The system also tells the operating system that the real controllers are on another PCI bus on an opposite side of a PCI-to-PCI bridge connected also to PCI bus 0. An I/O system manager selects one of the actual paths, which may, but need not, be connected to PCI bus 0, to handle communications with the peripheral devices. The I/O system manager maintains the controllers on the unselected path in an off-line or standby mode, in case of a failure of one or more of the controllers on the selected path. If a failure occurs, the I/O system manager performs a fail-over operation to change the selection of controllers, and the peripheral devices continue to operate in the same manner on the peripheral busses. The operating system does not respond to the controller failure by declaring a system failure, however, because the operating system continues to look to the virtual path, with its virtual controllers, as a valid path to the peripheral devices. The system also allows hot swapping of PCI bridges, through FET isolation of the unselected controllers. The devices on the PCI bus and the peripheral busses may also be hot swapped through selective FET isolation.

21 Claims, 8 Drawing Sheets

* ONLY SELECTED DEVICES SHOWN

U.S. PATENT DOCUMENTS

| | | | |
|---|---|---|---|
| 4,015,246 A | 3/1977 | Hopkins, Jr. et al. | 340/172.5 |
| 4,032,893 A | 6/1977 | Moran | 340/166 R |
| 4,059,736 A | 11/1977 | Perucca et al. | 179/175.2 R |
| 4,128,883 A | 12/1978 | Duke et al. | 364/200 |
| 4,228,496 A | 10/1980 | Katzman et al. | 364/200 |
| 4,245,344 A | 1/1981 | Richter | 371/68 |
| 4,263,649 A | 4/1981 | Lapp, Jr. | 364/200 |
| 4,275,440 A | 6/1981 | Adams, Jr. et al. | 364/200 |
| 4,309,754 A | 1/1982 | Dinwiddie, Jr. et al. | 364/200 |
| 4,366,535 A | 12/1982 | Cedolin et al. | 364/200 |
| 4,434,463 A | 2/1984 | Quinquis et al. | 364/200 |
| 4,449,182 A | 5/1984 | Rubinson et al. | 364/200 |
| 4,453,215 A | 6/1984 | Reid | 364/200 |
| 4,467,436 A | 8/1984 | Chance et al. | 364/513 |
| 4,484,273 A | 11/1984 | Stiffler et al. | 364/200 |
| 4,486,826 A | 12/1984 | Wolff et al. | 364/200 |
| 4,503,496 A | 3/1985 | Holzner et al. | 364/200 |
| 4,543,628 A | 9/1985 | Pomfret | 364/200 |
| 4,590,554 A | 5/1986 | Glazer et al. | 364/200 |
| 4,597,084 A | 6/1986 | Dynneson et al. | 371/51 |
| 4,608,631 A | 8/1986 | Stiffler et al. | 364/200 |
| 4,628,447 A | 12/1986 | Cartret et al. | 364/200 |
| 4,630,193 A | 12/1986 | Kris | 364/200 |
| 4,633,394 A | 12/1986 | Georgiou et al. | 364/200 |
| 4,654,857 A | 3/1987 | Samson et al. | 371/68 |
| 4,669,056 A | 5/1987 | Waldecker et al. | 364/900 |
| 4,669,079 A | 5/1987 | Blum | 370/85 |
| 4,700,292 A | 10/1987 | Campanini | 364/200 |
| 4,703,420 A | 10/1987 | Irwin | 364/200 |
| 4,750,177 A | 6/1988 | Hendrie et al. | 371/32 |
| 4,805,091 A | 2/1989 | Thiel et al. | 364/200 |
| 4,809,169 A | 2/1989 | Sfarti et al. | 364/200 |
| 4,816,990 A | 3/1989 | Williams | 364/200 |
| 4,827,409 A | 5/1989 | Dickson | 364/200 |
| 4,866,604 A | 9/1989 | Reid | 364/200 |
| 4,869,673 A | 9/1989 | Kreinberg et al. | 439/64 |
| 4,914,580 A | 4/1990 | Jensen et al. | 364/200 |
| 4,916,695 A | 4/1990 | Ossfeldt | 371/9.1 |
| 4,926,315 A | 5/1990 | Long et al. | 364/200 |
| 4,931,922 A | 6/1990 | Baty et al. | 364/200 |
| 4,939,643 A | 7/1990 | Long et al. | 364/200 |
| 4,974,144 A | 11/1990 | Long et al. | 364/200 |
| 4,974,150 A | 11/1990 | Long et al. | 364/200 |
| 4,985,830 A | 1/1991 | Atac et al. | 364/200 |
| 4,994,960 A | 2/1991 | Tuchler et al. | 364/200 |
| 5,005,174 A | 4/1991 | Bruckert et al. | 371/68.3 |
| 5,083,258 A | 1/1992 | Yamasaki | 395/725 |
| 5,099,485 A | 3/1992 | Bruckert et al. | 371/68.3 |
| 5,117,486 A | 5/1992 | Clark et al. | 395/250 |
| 5,138,257 A | 8/1992 | Katsura | 324/158 R |
| 5,179,663 A | 1/1993 | Iimura | 395/250 |
| 5,243,704 A | 9/1993 | Baty et al. | 395/325 |
| 5,247,522 A | 9/1993 | Reiff | 371/29.5 |
| 5,251,303 A | 10/1993 | Fogg, Jr. et al. | 395/275 |
| 5,270,699 A | 12/1993 | Signaigo et al. | 340/825.01 |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,345,566 A | 9/1994 | Tanji et al. | 395/325 |
| 5,428,766 A | 6/1995 | Seaman | 395/575 |
| 5,463,755 A | 10/1995 | Dumarot et al. | 395/475 |
| 5,465,340 A | 11/1995 | Creedon et al. | 395/846 |
| 5,530,302 A | 6/1996 | Hamre et al. | 307/147 |
| 5,537,535 A | 7/1996 | Maruyama et al. | 395/183.01 |
| 5,546,535 A * | 8/1996 | Stallmo et al. | 714/9 |
| 5,550,986 A | 8/1996 | DuLac | 395/280 |
| 5,555,372 A | 9/1996 | Tetreault et al. | 395/182.13 |
| 5,572,688 A | 11/1996 | Sytwu | 395/309 |
| 5,574,865 A | 11/1996 | Hashemi | 395/283 |
| 5,584,030 A | 12/1996 | Husak et al. | 395/750 |
| 5,600,784 A | 2/1997 | Bissett et al. | 395/182.1 |
| 5,613,162 A | 3/1997 | Kabenjian | 395/842 |
| 5,627,965 A | 5/1997 | Liddell et al. | 395/185.01 |
| 5,630,046 A | 5/1997 | Loise | 395/182.09 |
| 5,630,056 A | 5/1997 | Horvath et al. | 395/185.09 |
| 5,636,342 A | 6/1997 | Jeffries | 395/185.01 |
| 5,659,681 A | 8/1997 | Ojima | 395/183.19 |
| 5,671,443 A | 9/1997 | Stauffer et al. | 395/845 |
| 5,696,905 A | 12/1997 | Reimer et al. | 395/227 |
| 5,701,410 A | 12/1997 | BeMent et al. | 395/183.19 |
| 5,701,457 A | 12/1997 | Fujiwara | 395/608 |
| 5,737,601 A | 4/1998 | Jain et al. | 395/617 |
| 5,751,955 A | 5/1998 | Sonnier et al. | 395/200.19 |
| 5,758,065 A | 5/1998 | Reams et al. | 395/185.01 |
| 5,784,576 A | 7/1998 | Guthrie et al. | 395/283 |
| 5,790,397 A | 8/1998 | Bissett et al. | 364/131 |
| 5,790,775 A | 8/1998 | Marks et al. | 395/182.07 |
| 5,809,256 A | 9/1998 | Najemy | 395/283 |
| 5,809,285 A * | 9/1998 | Hilland | 703/25 |
| 5,812,748 A | 9/1998 | Ohran et al. | 395/182.02 |
| 5,815,647 A | 9/1998 | Buckland et al. | 395/182.01 |
| 5,828,903 A | 10/1998 | Sethuram et al. | 395/817 |
| 5,838,899 A | 11/1998 | Leavitt et al. | 395/185.09 |
| 5,838,900 A | 11/1998 | Horvath et al. | 395/185.09 |
| 5,838,993 A | 11/1998 | Riley et al. | 395/842 |
| 5,862,145 A | 1/1999 | Grossman et al. | 371/5.1 |
| 5,870,301 A | 2/1999 | Yakushiji et al. | 364/132 |
| 5,875,308 A | 2/1999 | Egan et al. | 395/283 |
| 5,875,351 A | 2/1999 | Riley | 395/842 |
| 5,881,251 A | 3/1999 | Fung et al. | 395/283 |
| 5,884,027 A | 3/1999 | Garbus et al. | 395/200.8 |
| 5,890,003 A | 3/1999 | Cutts, Jr. et al. | 395/736 |
| 5,892,928 A | 4/1999 | Wallach et al. | 395/283 |
| 5,894,560 A | 4/1999 | Carmichael et al. | 395/845 |
| 5,903,778 A | 5/1999 | Chang | 395/882 |
| 5,923,840 A | 7/1999 | Desnoyers et al. | 714/48 |
| 5,928,339 A | 7/1999 | Nishikawa | 710/26 |
| 5,944,800 A | 8/1999 | Mattheis et al. | 710/23 |
| 5,953,538 A | 9/1999 | Duncan et al. | 395/842 |
| 5,956,474 A | 9/1999 | Bissett et al. | 395/182.09 |
| 5,956,476 A | 9/1999 | Ranson et al. | 395/183.06 |
| 5,978,866 A | 11/1999 | Nain | 710/22 |
| 5,982,672 A | 11/1999 | Moon et al. | 365/189.01 |
| 5,983,289 A | 11/1999 | Ishikawa et al. | 710/35 |
| 5,991,844 A | 11/1999 | Khosrowpour | 710/129 |
| 5,991,900 A | 11/1999 | Garnett | 714/56 |
| 5,996,035 A | 11/1999 | Allen et al. | 710/103 |
| 6,000,043 A | 12/1999 | Abramson | 714/44 |
| 6,009,481 A | 12/1999 | Mayer | 710/33 |
| 6,009,535 A | 12/1999 | Halligan et al. | 714/5 |
| 6,012,119 A | 1/2000 | Ninomiya et al. | 710/128 |
| 6,012,120 A | 1/2000 | Duncan et al. | 710/129 |
| 6,021,456 A | 2/2000 | Herdeg et al. | 710/260 |
| 6,026,458 A | 2/2000 | Rasums | 710/103 |
| 6,032,201 A | 2/2000 | Tillery, Jr. et al. | 710/8 |
| 6,032,266 A | 2/2000 | Ichinohe et al. | 714/9 |
| 6,032,271 A | 2/2000 | Goodrum et al. | 714/56 |
| 6,041,375 A | 3/2000 | Bass et al. | 710/103 |
| 6,047,343 A | 4/2000 | Olarig | 710/102 |
| 6,049,894 A | 4/2000 | Gates | 714/41 |
| 6,052,795 A | 4/2000 | Murotani et al. | 714/3 |
| 6,055,584 A | 4/2000 | Bridges et al. | 710/27 |
| 6,062,480 A | 5/2000 | Evoy | 235/492 |
| 6,073,196 A | 6/2000 | Goodrum et al. | 710/103 |
| 6,085,333 A * | 7/2000 | DeKoning et al. | 714/7 |
| 6,098,137 A | 8/2000 | Goodrum et al. | 710/129 |
| 6,125,417 A | 9/2000 | Bailis et al. | 710/103 |
| 6,128,750 A | 10/2000 | Espy et al. | 714/7 |
| 6,134,679 A | 10/2000 | Liddell et al. | 714/49 |
| 6,141,769 A | 10/2000 | Petivan et al. | 714/10 |
| 6,145,036 A | 11/2000 | Barenys et al. | 710/101 |

| | | | |
|---|---|---|---|
| 6,154,802 A | 11/2000 | Khosrowpour | 710/128 |
| 6,173,312 B1 | 1/2001 | Atarashi et al. | 709/203 |
| 6,185,697 B1 | 2/2001 | Shiraishi | 714/6 |
| 6,202,115 B1 * | 3/2001 | Khosrowpour | 710/312 |
| 6,260,159 B1 | 7/2001 | Garnett et al. | 714/15 |
| 6,321,286 B1 | 11/2001 | Goodrum et al. | 710/129 |
| 6,324,627 B1 * | 11/2001 | Kricheff et al. | 711/163 |
| 6,338,150 B1 | 1/2002 | Johnson et al. | 714/39 |
| 6,363,448 B1 | 3/2002 | Waller et al. | 710/126 |
| 6,397,345 B1 | 5/2002 | Edmonds et al. | 714/4 |
| 6,430,636 B1 | 8/2002 | Cranston et al. | 710/107 |
| 6,430,710 B1 | 8/2002 | Moriyama et al. | 714/43 |
| 6,449,729 B1 | 9/2002 | Sanders et al. | 714/4 |
| 6,449,731 B1 | 9/2002 | Frey, Jr. | 714/9 |
| 6,505,311 B1 | 1/2003 | Ichinohe et al. | 714/56 |
| 6,519,671 B1 | 2/2003 | Kondou et al. | 710/311 |
| 6,530,043 B1 | 3/2003 | Beardsley et al. | 714/52 |
| 6,536,000 B1 | 3/2003 | Jackson et al. | 714/57 |
| 6,550,017 B1 | 4/2003 | Moiin et al. | 714/4 |
| 6,557,121 B1 | 4/2003 | McLaughlin et al. | 714/44 |
| 6,563,595 B1 | 5/2003 | Galloway | 358/1.1 |
| 6,564,340 B1 | 5/2003 | Odegard et al. | 714/43 |

FOREIGN PATENT DOCUMENTS

| | | | |
|---|---|---|---|
| EP | 0 428 330 A2 | 5/1991 | G06F/13/30 |
| EP | 0 475 005 B1 | 11/1995 | G06F/15/16 |
| EP | 0 293 860 B1 | 2/1996 | G06F/13/28 |
| EP | 0772127 A1 | 5/1997 | 11/20 |
| EP | 0 390 567 B1 | 6/1999 | H04L/29/06 |
| GB | 2 060 229 A2 | 4/1981 | G06F/3/00 |
| WO | WO 97/24677 | 7/1997 | G06F/13/00 |
| WO | WO 98/21660 | 5/1998 | G06F/13/00 |
| WO | WO 99/59066 | 11/1999 | G06F/11/20 |
| WO | WO99/66410 | 12/1999 | G06F/11/22 |

* cited by examiner

SYSTEM AND METHOD FOR OPERATING A SYSTEM WITH REDUNDANT PERIPHERAL BUS CONTROLLERS

FIELD OF THE INVENTION

The invention relates generally to fault tolerant computer systems and, more particularly, to mechanisms for fault tolerant access to system-critical devices on peripheral busses.

BACKGROUND OF THE INVENTION

Fault-tolerant computer systems are employed in situations and environments that demand high reliability and minimal downtime. Such computer systems may be employed in the tracking of financial markets, the control and routing of telecommunications and in other mission-critical functions such as air traffic control.

A common technique for incorporating fault-tolerance into a computer system is to provide a degree of redundancy to various components. In other words, important components are often paired with one or more backup components of the same type. As such, two or more components may operate in a so-called lockstep mode in which each component performs the same task at the same time, while only one is typically called upon for delivery of information. Where data collisions, race conditions and other complications may limit the use of lockstep architecture, redundant components may be employed in a failover mode. In failover mode, one component is selected as a primary component that operates under normal circumstances. If a failure in the primary component is detected, then the primary component is bypassed and the secondary (or tertiary) redundant component is brought on line. A variety of initialization and switchover techniques are employed to make a transition from one component to another during runtime of the computer system. A primary goal of these techniques is to minimize downtime and corresponding loss of function and/or data.

Fault-tolerant computer systems are often costly to implement since many commercially available components are not specifically designed for use in redundant systems. It is desirable to adapt conventional components and their built-in architecture whenever possible.

To reduce downtime, fault tolerant systems are designed to include redundancy for connections and operations that would otherwise be single points of failure for the system. Accordingly, the fault tolerant system may include redundant CPUs and storage devices. Certain devices on peripheral busses may also be single points of failure for the system. In a system that uses a Windows operating system, for example, the loss of a controller for peripheral busses and/or a video controller results in a system failure.

Devices such as a keyboard, mouse, monitor, floppy drives, CD ROM drives, and so forth typically communicate with a system I/O bus, such as a PCI bus, over a variety of peripheral busses such as a USB and an ISA/IDE bus. The various peripheral busses connect to the PCI bus through a peripheral bus controller, such as an Intel PCI to ISA/IDE Xcelarator. The windows operating systems require that the peripheral bus controller plug into location 0 on the system PCI bus, or what is commonly referred to as "PCI bus 0."

A PCI-to-PCI bridge may be used to provide additional slots on a PCI bus. A bridge for use with the PCI bus 0, for example, provides slots for the system-critical peripheral bus controller and video controller, and various other devices. The PCI-to-PCI bridge is then a single point of failure, as is the peripheral bus controller and the video controller. While it is desirable to provide fault tolerance by including redundant paths to the peripheral devices, through redundant PCI-to-PCI bridges and associated peripheral bus controllers and video controllers, the operating system is not equipped to handle them. The operating system requires that all of the peripheral bus controllers connect to PCI bus 0, and redundant controllers alone thus can not provide the desired, fully redundant paths to the peripheral devices. Accordingly, what is needed is a mechanism to achieve such redundancy within the confines of the commercially available operating systems.

SUMMARY OF THE INVENTION

The inventive system essentially hides redundant paths to the peripheral devices from the operating system, by reporting a single "virtual" path to the peripheral busses over PCI bus 0. The virtual path includes at least a virtual peripheral bus controller and a virtual video controller. The system also tells the operating system that the real controllers are on another PCI bus on an opposite side of a PCI-to-PCI bridge connected also to PCI bus 0. An I/O system manager selects one of the actual paths, which may, but need not, be connected to PCI bus 0, to handle communications with the peripheral devices.

The I/O system manager maintains the controllers on the unselected path in an off-line or standby mode, in case of a failure of one or more of the controllers on the selected path. If a failure occurs, the I/O system manager performs a fail-over operation to change the selection of controllers, as discussed in more detail below. The operating system does not respond to the controller failure by declaring a system failure, however, because the operating system continues to look to the virtual path, with its virtual controllers, as a valid path to the peripheral devices. Accordingly, the fail-over operation does not adversely affect the overall operations of the system.

As discussed in more detail below, the system also allows hot swapping of PCI bridges, and associated devices on the PCI bus and the peripheral busses.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
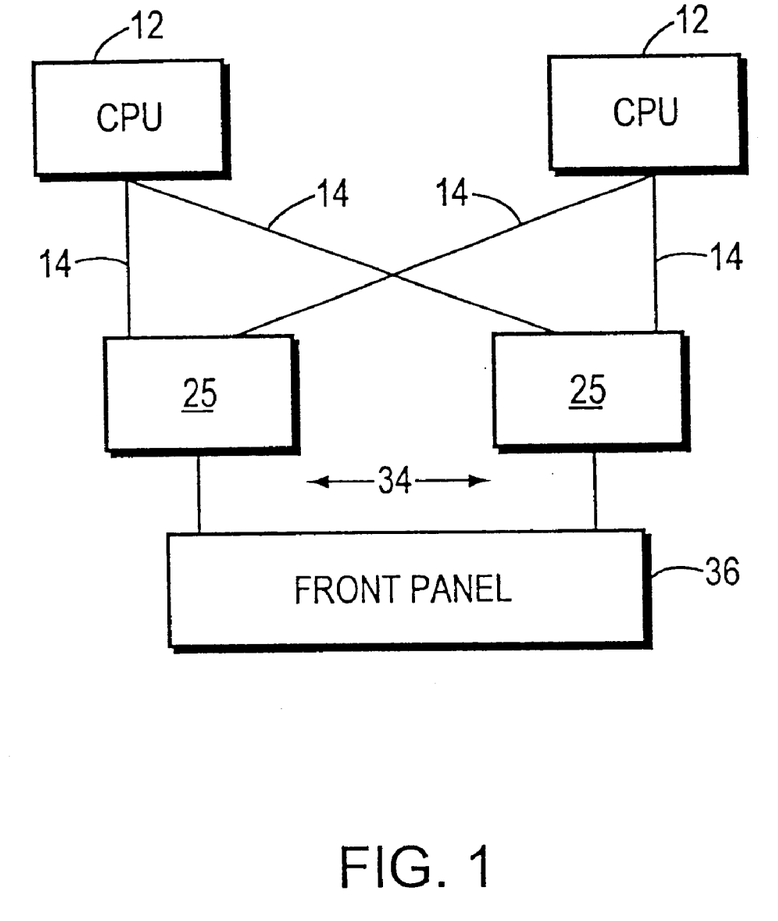
FIG. 1 is a high-level functional block diagram of a system constructed in accordance with the invention.

Referring to FIG. 1 a fault tolerant computer system provides redundant communication paths between each central processing unit 12 and peripheral devices that are supported by or connected to a system front panel 36. The communications paths include redundant system PCI busses 14, redundant peripheral busses 34 and redundant PCI-to-peripheral bus connections, which are depicted in the drawing as blocks 25. The CPUs 12 are redundant, and thus, the system is tolerant of faults in the CPUs 12, the busses 14 and 34 and the bus-to-bus connections represented by the blocks 25. We discuss the system hardware and system operations in more detail below.

Figure 2:
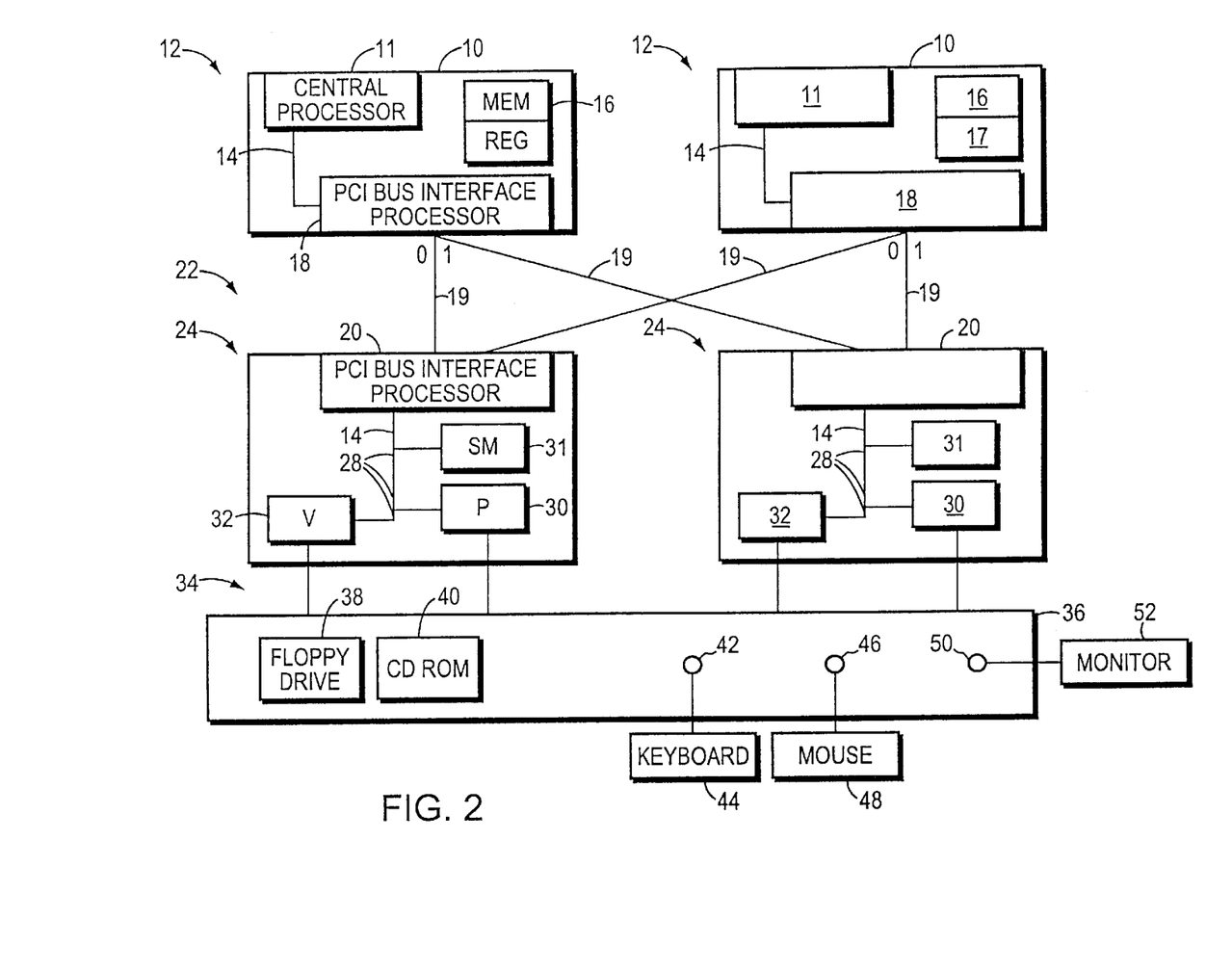
FIG. 2 is a more detailed functional block diagram of the system.

Referring now to FIG. 2, each CPU 12 consists of one or more central processors 11 that reside on a CPU board 10 along with associated memory and registers 16 and a "north-side" PCI bridge interface processor 18. The CPU 12 communicates over redundant PCI-to-PCI bridges 22 with an I/O subsystem 24. The I/O subsystem includes redundant I/O boards 26 that provide connections to redundant peripheral busses 34, which connect, in turn, to the various peripheral devices that are supported by or connected through the front panel 36.

A given PCI-to-PCI bridge 22 includes the north-side PCI bridge interface processor 18 that connects to a north-side of the PCI bus 14 on an associated CPU board 10, a bus 19 and a "south-side" PCI bridge interface processor 20 that connects to the south-side of the PCI bus 14 on an associated I/O board 26. The north-side PCI bridge interface processor provides connections to two locations on the north side PCI bus 14, namely, physical location 0 and location 1, which are referred to hereinafter as PCI bus 0 and PCI bus 1. The south-side PCI bridge interface processor 20 similarly connects to two locations on the south side PCI bus 14 and provides PCI slots 28 to connect at least a peripheral bus controller 30 and a video controller 32 to the PCI bus. In the exemplary system, there is also a slot 28 for an I/O system manager 31 that monitors and controls certain operations of I/O subsystem hardware. There may be additional PCI slots for SCSI devices (not shown), and so forth.

The peripheral bus controller 30 and video controller 32 provide the actual interconnection between the PCI bus 14 and one end of the peripheral busses 34. The peripheral busses 34 connect at their other ends to storage devices such as a floppy drive 38 and a CD ROM drive 40 that are supported by the front panel 36, and front-panel connectors 42, 46 and 50 for a keyboard 44, a mouse 48 and a monitor 52, respectively. The peripheral busses 34 include standard peripheral busses, such as a USB for the keyboard and so forth, and/or one or more ISA/IDE busses for the drives. The front panel 36 may support multiple floppy drives 38 or CD ROM drives 40 and/or include additional connectors for devices such as modems, and so forth.

Figure 3:
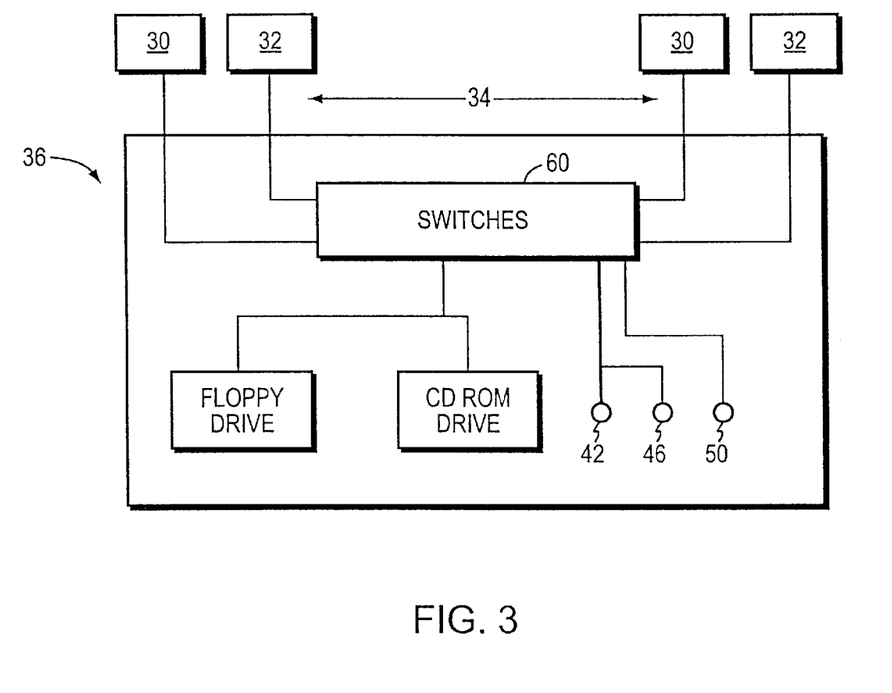
FIG. 3 is a more detailed functional block diagram of a front panel included in the system of FIG. 2.

As depicted in FIG. 3, the front panel also contains switches 60 that connect on one side to the redundant peripheral busses 34 and on the other side to the floppy drive 38, CD ROM drive 40, and the connectors 42, 46 and 50. The switches 60 operate under the control of the I/O system manager 31, to pass signals between the devices connected to or supported by the front panel 36 and a selected set of the peripheral busses 34, as discussed in more detail below.

The system depicted in FIGS. 1–3 provides fully redundant communications paths from each CPU 12 to the front panel 36. Accordingly, the failure of any devices on the redundant paths should not, from a hardware point of view, cause the system to go down. As is known to those skilled in the art, any path to the peripheral devices should be designed to ensure signal integrity. Accordingly, the lengths of each of the paths in the current system should be minimized and, in this system, the redundant paths should be essentially the same length. Further, the impedance of the traces in each path should be carefully controlled.

Failures of the non-redundant peripheral devices that plug into the front panel, such as the keyboard or monitor, while perhaps inconvenient to the user, are not system-critical failures. These devices can readily be replaced by plugging in replacements. As discussed in more detail below with reference to FIG. 9, the front panel 36 is designed for hot swapping, such that the floppy and CD ROM drives and the connectors can also be replaced without having to bring the system down.

We discuss immediately below how the system operates with redundant paths to the peripheral devices, when the operating system requires that the peripheral bus controller and the video controller connect only to PCI bus 0.

When the system boots-up, it configures the system hardware using a predetermined, or default, pairing of a CPU and a set of I/O subsystem components that are resident on a selected I/O board 26. The default pairing also includes a default selection of the peripheral bus and video controllers 30 and 32 that are resident on the selected I/O board. If the default selections should fail to boot the system, the system selects another CPU and/or set of I/O subsystem components to use for the boot-up operation. If another set of I/O subsystem components is selected for the boot-up operations, the system also changes its selection of the peripheral bus and the video controllers to those on the selected board.

Figure 4:
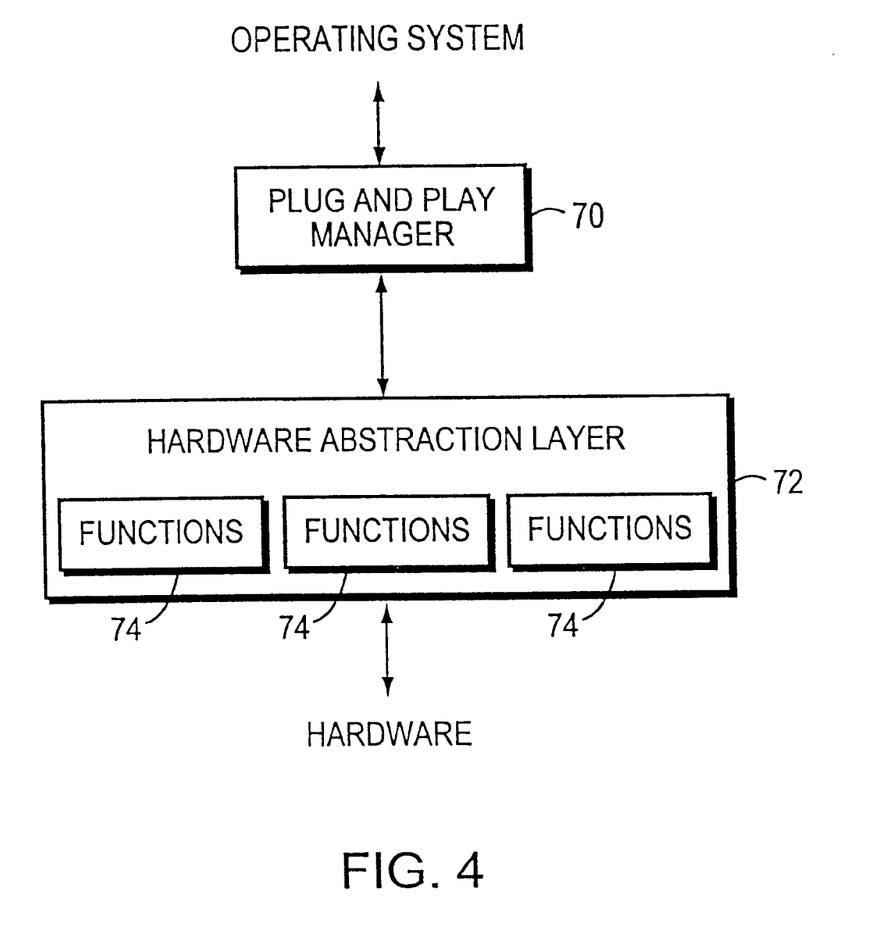
FIG. 4 is a high-level functional block diagram of system configuration software layers.
Figure 5:
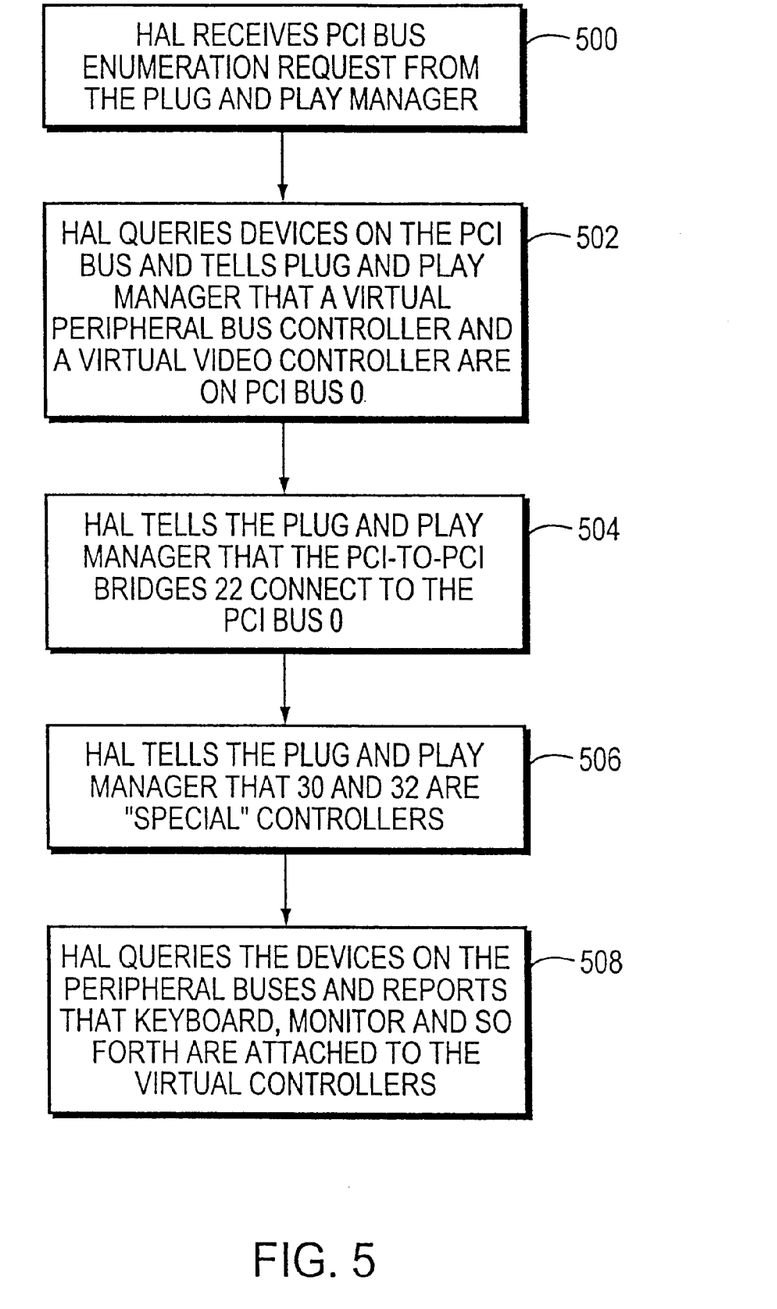
FIG. 5 is a flow chart of the operations of a hardware abstraction layer of FIG. 4.

Referring now also to FIGS. 4 and 5, as part of the boot-up operations, a plug and play manager 70 calls on routines, or functions, 74 in a hardware abstraction layer 72, or HAL, which is essentially an interface between the operating system and the system hardware. The plug and play manager requests that the HAL, using these functions 74, enumerate the PCI bus 14, and thereafter, the devices attached to the PCI bus.

To enumerate the PCI bus 14 (step 500), the functions 74 send queries to the devices on the bus by location. The devices respond to the query by identifying themselves at least by type, that is, as peripheral bus controllers, video controllers and so forth. The functions 74 determine from the responses that there are redundant peripheral bus controllers 30 and video controllers 32 on PCI busses 0 and 1. The functions 74 then essentially hide the redundant peripheral bus controllers and the redundant video controllers from the operating system by informing the plug and play manager that a "virtual" peripheral bus controller and a "virtual" video controller are on PCI bus 0 (step 502). The functions 74 report the virtual system-critical controllers on PCI bus 0 even if only a single set of controllers 30 and 32 are included in the system. In this way, the addition of redundant controllers to the system at a later time does not alter the path to the peripheral devices from the view point of the operating system.

Figure 6:
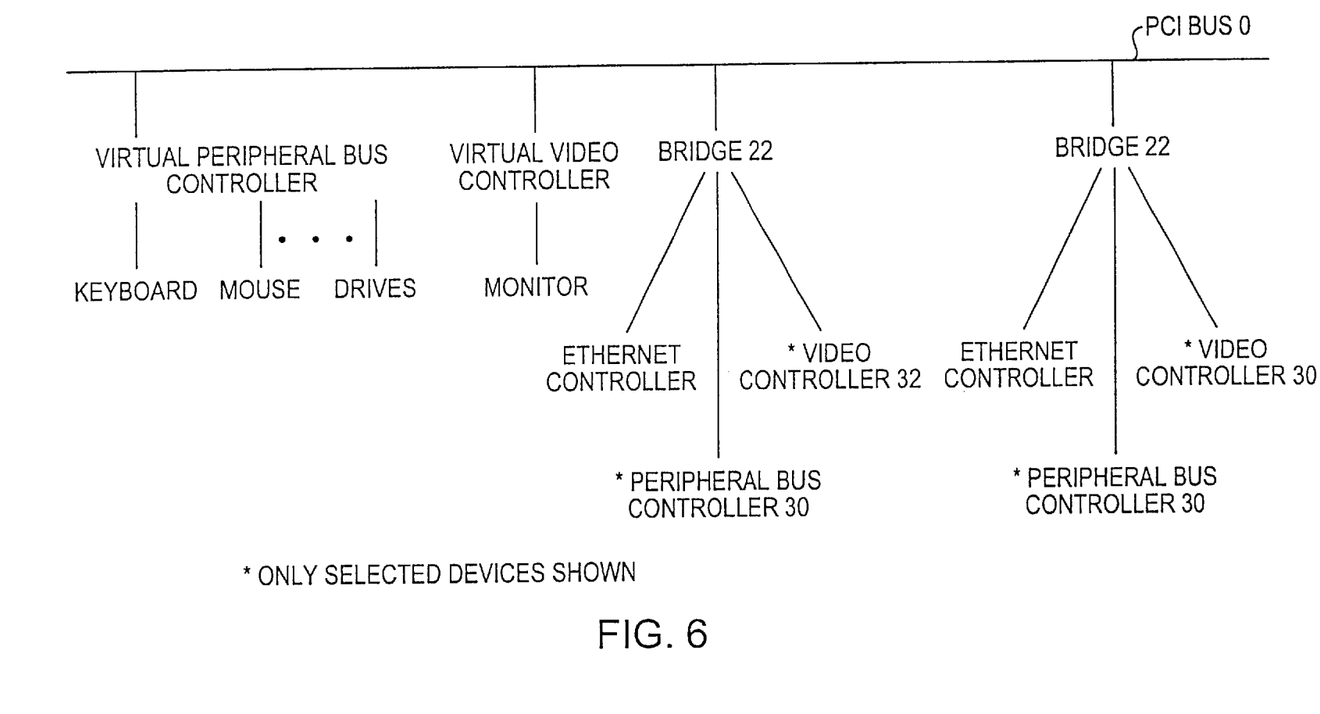
FIG. 6 depicts a view of the I/O subsystem of FIG. 2 by a plug and play manager of FIG. 4.

Referring also to FIG. 6, which depicts the devices, both real and virtual, as seen from the point of view of the plug and play manager, the functions 74 also inform the plug and play manager that the two PCI-to-PCI bridges 22 are on PCI bus 0 and that various other devices such as, for example, ethernet controllers and so forth are on the south side of each of the bridges 22 (step 504). Further, the functions 74 list, as attached to the south side of each bridge 22, the selected controllers 30 and 32 identified as "special" controllers, such as "stratus controllers," so that the plug and play manager and/or the operating system will not interpret them to be the system-critical bus and video controllers (step 506). As a final enumeration step, the functions 74 query the devices on the peripheral busses 34 and tell the plug and play manager that the various peripheral devices, such as the keyboard, mouse, monitor and so forth are attached to the appropriate virtual controllers (step 508).

The plug and play manager 70 assigns appropriate device functions to the key board, the mouse, and so forth, and informs the operating system about the various peripheral devices that are attached to the virtual controllers. The operating system then, in a conventional manner, assigns appropriate device objects to the devices.

As part of the boot-up operations, the system also configures I/O address space for communications to and from the front-panel devices. The system sets up the I/O address space on the CPU side of the PCI-to-PCI bridges 22, so that the space is accessible to all of the peripheral bus and video controllers. The I/O space is thus set up in the memory 16 on each CPU board.

At any given time, the system permits only one peripheral bus controller and one video controller to claim the I/O address space in the memory 16. The system uses a peripheral bus configuration register 17 (FIG. 2) on the CPU board 10, or at least one predetermined bit location in the register, to establish which controllers may claim the I/O address space in the memory 16. The register bit is thus set to the appropriate value to select, as appropriate, the controllers connected to the PCI bus 0 at the CPUs or the controllers connected to the PCI bus 1 at the CPUs. The PCI bridge interface processor 18 responds to the state of the address space bit by passing information to and from the I/O address space and the selected controllers over the appropriate connections to PCI bus 0 or PCI bus 1.

If one of the selected controllers 16 or 22 should later fail, the system performs a fail-over operation to change its controller selections. As part of the fail-over operation, the I/O system manager 31 disables the PCI bus interface processor 20 associated with the failed controller, and thus, the south sides of the associated PCI-to-PCI bridges 22. The I/O system manager 31 on the south side of the other PCI-to-PCI bridges 22 is notified of the failure, and responds by changing the setting in the configuration registers 17 on each of the CPU boards 12, to give the previously unselected controllers access to the I/O address space in the memory 16. The I/O system manager 31 also changes the control setting of the switches 60, such that the switches use the peripheral busses 34 associated with the newly selected set of controllers 30 and 32.

The newly selected controllers 30 and 32 are either powered down or in standby mode at the time they are selected. Accordingly, the controllers must be configured to set the associated internal registers and memory to the appropriate states. The controller configuration may be performed in essentially the same manner as it is performed during a boot-up operation, and the internal registers and memory may be set to the default states. Alternatively, the I/O system manager 31 may periodically save the internal states of the selected controllers 30 and 31, and use these states to configure the newly selected controllers. The I/O system manager must also handle the fail-over of the other controllers on the south side of the PCI bus in an appropriate manner.

The controller failure is reported to the plug and play manager 72 either by one of the I/O system managers 31 based on errors detected through system diagnostics, or by some other system component. The plug and play manager requests that the HAL functions 74 again enumerate the PCI bus 14. In response, the functions provide to the plug and play manager the same information about the virtual controllers on PCI bus 0, the attached PCI-to-PCI bridges, and so forth. The functions 74 also tell the plug and play manager that the special controllers 30 and 32 connected to the south side of one of the bridges 22 are no longer connected, and that other special controllers, that is, the previously non-selected controllers 30 and 32, are now connected to the south side of the other bridge 22. The plug and play manager determines that the reported change in the controller connections does not warrant the sending of an error message to the other system components, however, because the virtual controllers still provide the path to the peripheral devices.

The PCI-to-PCI bridge 22 associated with the failed controller is disabled in the exemplary system so that, as appropriate, the I/O board 26 and devices resident thereon can be replaced, or hot swapped, as discussed in more detail below. Alternatively, the faulty controller alone may be hot swapped while the associated bridge 22 is disabled.

As discussed above, the I/O system manager 31 may periodically save the internal states of the selected peripheral bus controller 30 and the video controller 32. The system may also track the time between failures of the various controllers, or other statistics that allow the system essentially to predict controller failure. The system can then save the controller states, and change its selection of controllers at an appropriate time before a failure occurs.

We discuss below the hot plugging operations of the system. First, we discuss hot plugging an I/O board 26. Then, we discuss hot plugging a device into a PCI slot 28. Finally, we discuss hot plugging the front panel 36 and associated devices.

Figure 7:
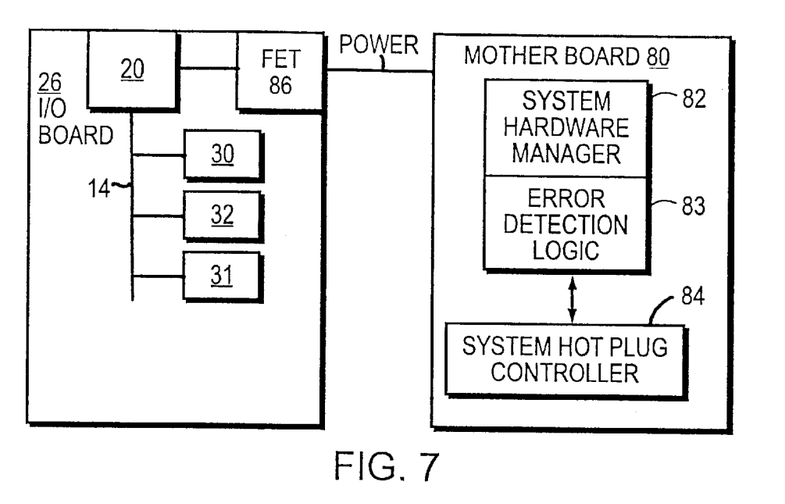
FIG. 7 is a more detailed functional block diagram of an I/O board of FIG. 2.

Referring now to FIG. 7, diagnostic routines performed by a system hardware manager 82 and/or error detection logic 83, which are resident in whole or in part on a mother board 80 into which the I/O boards 26 plug, inform a system hot plug controller 84 and the I/O system manager 31 that a device resident on a particular I/O board, such as the peripheral bus controller 30, has failed. The system hardware manager 82 and/or the error detection logic 83 may determine that the bus controller 30 has failed based on errors in the communications from the bus controller, such as the bus controller using an address with a parity error or the bus controller not starting a bus transaction within a predetermined time after being granted access to the bus, and so forth.

In response, the I/O system manager 31 asserts an I/O broken signal. The I/O manager then changes the controller selection for the peripheral busses, as discussed above, so that the board no longer receives signals from or directs signals to the peripheral devices. The hot plug controller 84 next electrically isolates the I/O board 26 and the various devices thereon from the PCI bus by disabling a switch, for example, FET 86, through which power is supplied at least to the processor 20. The faulty I/O board 26 can then be removed.

When the I/O board 26 is unplugged from the system an associated board present signal is de-asserted by a switch that is part of a back panel (not shown), which is opened to gain access to the board. The open back panel also opens a switch that cuts power to the board 26. A new board is then plugged into the system and the back panel is closed. This again asserts the board present signal and provides power to the board. The I/O system manager 31 then asserts a reset signal as part of its boot-up operations. The I/O broken signal remains asserted, that is, it is still essentially held by the state of a bit in a status register on the CPUs. The I/O system manager then configures the new board 26, that is, it sets the clock and logic levels on the new board in a conventional manner.

When the clock and logic levels are valid, the I/O system manager de-asserts the reset signal. A predetermined time thereafter the manager also de-asserts the I/O broken signal. By the time both signals are de-asserted, the new I/O board 26 is fully configured and operational, and the I/O system manager can then bring the board on-line by changing the board status to on-line at a time that allows the board to properly handle a next PCI bus transaction. Other register and memory information may be copied from the other I/O board 26, as necessary. The insertion of the board in this manner does not disrupt the devices and/or transaction on the system PCI bus.

Figure 8:
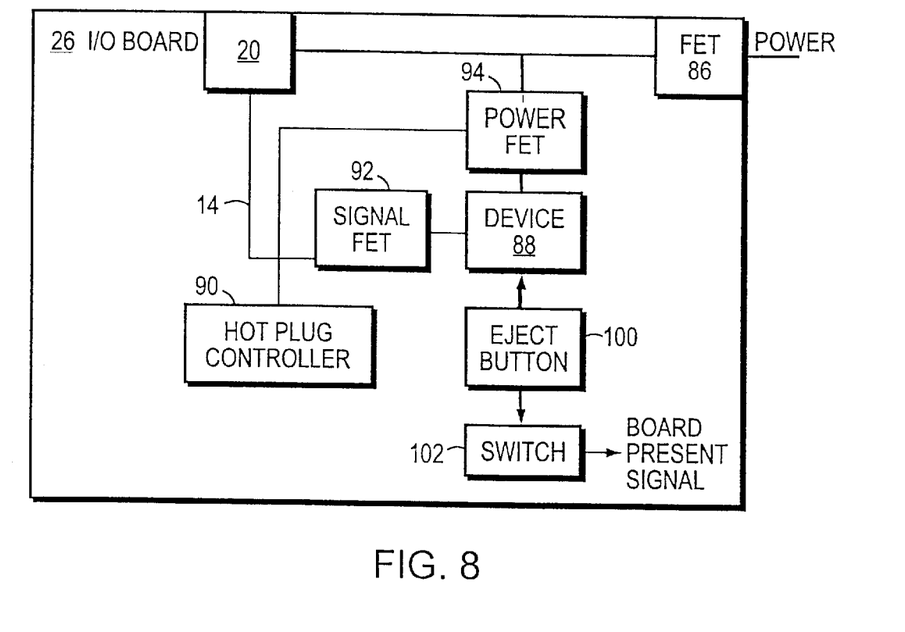
FIG. 8 is a more detailed functional block diagram of an I/O board of FIG. 2.

Referring now to FIG. 8, we discuss hot plugging a device into the PCI bus. As discussed above, the system hardware manager 82 or the error detection logic 83 detects the failure of a device 88 that is on the PCI bus. The I/O system manager 31 responds to the failure by asserting the I/O broken signal, also as discussed above. In the exemplary system, the system manager 31 may change the selection of controllers 30 and 32 if the failed device is, for example, the video controller 32. Otherwise, the manager may leave the controller selection in place.

If the device is in a hot pluggable slot 28, a hot plug controller 90 resident on the I/O board isolates the failed device 88 from the PCI bus 14 by turning off a signal FET 92 that resides in the slot 28 between the PCI bus 14 and the device 88. The hot plug controller 80 then turns power off to the slot 28 through a power FET 94, which powers down the device 88 that is plugged into the slot. At the same time the I/O system manager 31 changes the status of the slot 28 to off-line. The electrical isolation of the device 88 and later powering off of the PCI slot 28 does not adversely affect the operations of the other devices on the PCI bus 14.

The isolated device 88 can now be removed from the powered-off slot 28, and a new device can be hot plugged into the slot, without disrupting the other devices on the PCI bus. To remove the device, an ejector button 100 is activated. The button 100 controls a switch 102 that, in turn, controls a board present signal. The signal is de-asserted when the switch 102 is activated, to indicate that the slot 28 is empty.

When a new device 88 is plugged into the slot 28 the ejector button 100 is deactivated to close the switch 102 and the device present signal is again asserted. The hot plug controller 90 then applies power to the slot through the power FET 94, and the device 88 boots, to establish its clock and logic levels. At the same time the I/O system manager 31 asserts a reset signal. After the clock and associated logic levels are established and guaranteed to be valid the I/O system manager 31 deasserts the reset signal. When the PCI bus is next idle, the hot plug controller 90 enables the signal FET 92, to connect the device to the PCI bus. A predetermined time thereafter, the I/O system manager 30 de-asserts the I/O broken signal, and the device 88 goes on-line.

In the exemplary system, the connectors for the devices have power pins that are shorter than the signal pins and ground pins that are longer than the signal pins. Accordingly, as a device is removed from the slot, the power pins disconnect immediately and the ground pins are the last to disconnect, to prevent noise from disrupting the other devices on the board. Similarly, when a device is plugged into the system, the ground pins are the first to connect and the power pins the last to connect, to prevent damage to the device being inserted and to the other devices on the board.

Certain of the peripheral devices 18, such as the CD ROM, floppy drive and so forth may be essentially part of the front panel 36, along with the various connectors for the plug in devices such as, for example, the monitor and keyboard. Since these are noncritical devices, they are not duplicated in the system. When one of these front panel devices or connectors fails, the entire front panel in the exemplary system can be replaced without disrupting the system.

Figure 9:
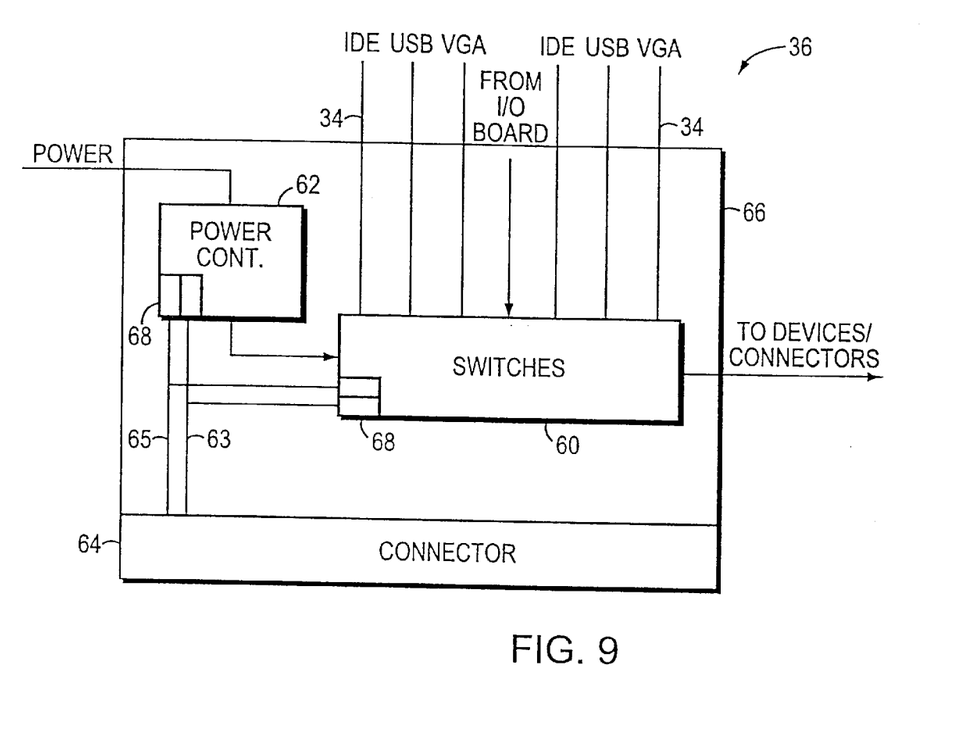
FIG. 9 is a more detailed functional block diagram of a front panel of FIG. 3.

Referring now to FIG. 9, the front panel 36 electrically connects to system power through a power controller 62 and to the peripheral busses 34 through a front panel board 66 that includes the switches 60. As discussed above, certain pins on the connectors between boards are shorter to provide last-to-make and first-to-break connections. For the connector 64, the pins for two enable lines 65 and 63 are short. These pins connect to ground on a shield board (not shown), into which the front panel board 66 plugs to electrically connect the associated peripheral devices and/or connectors to the peripheral busses 34 and system power. When the front panel board is fully plugged into the shield board, the two enable lines are drawn to a desired low state to signal that the board is then present.

To ensure that the enable lines are not drawn to the desired state, which in the exemplary system is the low state, before the board 66 is fully inserted, pull-ups 68 are included on the lines in the switches 60 and power controller 62. The pull-ups keep the lines 65 and 63 high until they are driven low by their connection to ground.

When the lines 65 and 63 are high, the switches 60 are disabled, and the IDE, USB and VGA busses are shut off. Accordingly, as soon as a user begins to remove the front panel board 66, the busses are turned off by the switches 60. In this way the bus signal pins and, in particular, the IDE signal pins, are protected from any power spikes that may occur as the board 66 powers down.

The enable lines 65 and 63 connect also to the power controller 62. As the front panel board 66 is removed, the power controller turns off and powers down the board. The power ramps down, however, so that the switches 60 turn off before the power is fully off. This ensures that the switches 60 operate properly to protect the bus signal pins as the board is removed.

When the front panel is removed, the I/O system manager 31 notices the change and notifies the plug and play manager 72. The plug and play manager requests a PCI bus enumeration, and the HAL functions 74 then tell the plug and play manager that certain peripheral devices are no longer connected, and the plug and play manager determines that the user should be notified.

Once the faulty devices and/or connectors are replaced, the front panel can be plugged back into the system. When the board is inserted, the two enable lines are drawn low and power is supplied to the front panel board 66 through the power controller 62. The switches 60 are also enabled and provided power, such that they again connect the peripheral devices and connectors to the selected set of peripheral busses based on control signals supplied by the system manager. The plug and play manager is then told of the change to the I/O subsystem, and the change is reflected in adding the devices to the virtual controllers as part of PCI bus enumeration, and the system continues to operate.

What is claimed is:

1. A computer system including:
   A. one or more system components connected to a first bus;
   B. redundant sets of one or more controllers that connect to redundant second busses and allow communications between the first bus and the second busses;
   C. one or more functions for presenting to a computer operating system a communication path from the first bus to one of the second busses through a set of one or more virtual controllers, and
   D. an I/O subsystem manager for redirecting to a selected set of the one or more controllers the communications that are directed through the virtual controllers.

2. The computer system of claim 1 wherein the I/O subsystem manager changes the selection of the set of one or more controllers from a previously selected set when one or more of the controllers in the previously selected set fails.

3. The computer system of claim 2 wherein each second bus connects at one end to one set of one or more controllers and at a second end to one or more peripheral devices.

4. The computer system of claim 3 further including switches for connection to the second busses at ends associated with the peripheral devices, the switches being directed by the I/O subsystem manager to select the second bus associated with the selected set of controllers.

5. The computer system of claim 4 wherein the sets of one or more controllers include peripheral bus controllers, video controllers or both.

6. The computer system of claim 1 wherein the system components connect to redundant first busses.

7. The computer system of claim 6 wherein the system components are central processing units.

8. The computer system of claim 6 wherein the I/O system manager controls the selection of the set of one or more controllers for interconnecting the first busses and the second bus associated with the selected set of controllers.

9. The computer system of claim 8 wherein the I/O subsystem manager changes the selection of the set of one or more controllers from a previously selected set when one or more of the controllers in the previously selected set fails.

10. The computer system of claim 9 further including switches for connection to the second busses at ends associated with the peripheral devices, the switches being directed by the I/O subsystem manager to select the second bus associated with the selected set of controllers.

11. The computer system of claim 1 further comprising
    E. a bridge electrically interconnecting separate portions of the first bus;
    F. one or more connection slots connecting to the first bus on one side of the bridge for providing plug-in connectors for connecting devices to the first bus;
    G. field effect transistors (FETS) connecting between the first bus and the devices plugged into the connection slots; and
    H. a hot plug controller for selectively controlling the FETS, to electrically isolate a selected device from the first PCI bus.

12. The computer system of claim 11 wherein the hot plug controller further
    i. resets the slot containing the isolated device, and
    ii. turns power off to the slot, to allow the device to be removed.

13. The computer system of claim 12 wherein the hot plug controller further
    iii. again resets the slot when a new device is plugged into the slot,
    iv. powers the slot to reset power to the device, and
    v. controls the FET to connect the device to the first bus.

14. The computer system of claim 13 further including an I/O system manager for controlling the hot plug of a board that is one side of the bridge, the controller
    a. setting an I/O broken signal to end communications over the bridge;
    b. resetting the devices on the board and turning power to the board off;
    c. de-asserting a board present signal when the board is removed from the system;
    d. asserting the board present signal when a new board is plugged into the system;
    e. asserting a reset signal and resetting clocks and logic levels on devices on the new board;
    f. deasserting the reset signal when the clocks and logic have reached stable levels; and
    g. deasserting the I/O broken signal a predetermined time after the reset signal is deasserted.

15. The computer system of claim 14 further including
    E. a front panel that connects the peripheral devices to one end of peripheral busses which at a second end connect to one side of the bridge;
    F. FETs that control a connector between the front panel devices and the peripheral bus, the FETs controlling power to the front panel and the peripheral devices; and
    G. a handle for locking the front panel to the system and controlling the FETS, the handle in an open position disabling the FETs and unlocking the front panel to allow the removal of the front panel from the system, and in a closed position locking the front panel to the system and enabling the FETs to provide power to the front panel and the peripheral devices.

16. A method of operating a computer system including the steps of:
    A. presenting to a computer operating system a communication path from a first bus to a second bus through a set of one or more virtual controllers, and
    B. redirecting to a selected set of one or more controllers communications that are directed through the virtual controllers.

17. The method of claim 16 wherein the method further includes the step of changing the selection of the set of one or more controllers from a previously selected set when one or more of the controllers in the previously selected set fails.

18. The method of claim 17 wherein the sets of one or more controllers connect to redundant second busses.

19. The method of claim 18 wherein the second busses connect also to peripheral devices.

20. The method of claim 19 further including the step of selecting at the peripheral devices the second bus associated with the selected set of controllers.

21. The method of claim 20 wherein the sets of one or more controllers include peripheral bus controllers, video controllers or both.

* * * * *

UNITED STATES PATENT AND TRADEMARK OFFICE
CERTIFICATE OF CORRECTION

PATENT NO. : 6,708,283 B1
DATED : March 16, 2004
INVENTOR(S) : Nevin et al.

It is certified that error appears in the above-identified patent and that said Letters Patent is hereby corrected as shown below:

Title page,
Item [75], Inventors, should read:
-- Robert E. Nevin, Derry, NH (US);
   Mark D. Tetreault, Webster, MA (US);
   Andrew Alden, Leominster, MA (US);
   Mohsen Dolaty, Acton, MA (US);
   John W. Edwards, Jr., Clinton, MA (US);
   Michael W. Kement, Northboro, MA (US);
   John R. MacLeod, Cambridge, MA (US) --

Signed and Sealed this

Eighth Day of June, 2004

JON W. DUDAS
*Acting Director of the United States Patent and Trademark Office*